Figure 1:
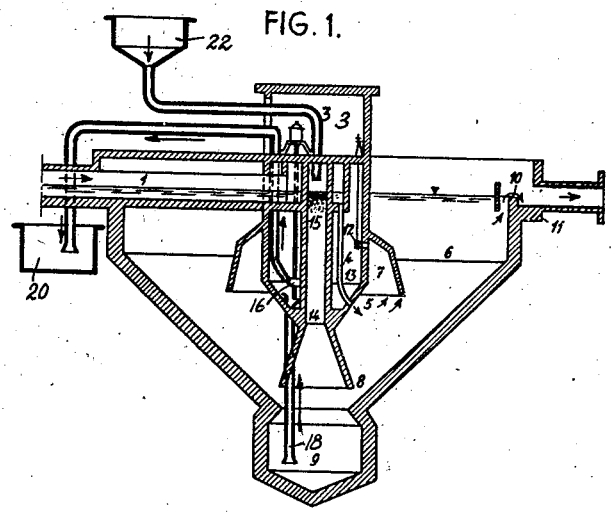

Oct. 24, 1939.  H. P. L. BENDEL  2,177,167

CLARIFICATION PLANT FOR PHYSICALLY CLARIFYING SEWAGE

Filed Nov. 6, 1936

Inventor
Henry Phil Ludwig Bendel
by B. Singer
Attorney

Patented Oct. 24, 1939

2,177,167

UNITED STATES PATENT OFFICE 2,177,167

CLARIFICATION PLANT FOR PHYSICALLY CLARIFYING SEWAGE

Henry Phil Ludwig Bendel, Paris, France

Application November 6, 1936, Serial No. 109,407
In France November 7, 1935

12 Claims. (Cl. 210—3)

This invention relates to a clarification plant for physically clarifying sewage (including waste water, waste liquor, effluents) in which the sewage with all its suspended matter is sucked off through vertical immersion pipes out of a supply channel into the clarification chamber, the suspended material driven upwardly in the clarification chamber by ascending motion of flow of the sewage through the same being invisibly collected by a submerged hood, whilst the material which settles is collected in a central sludge collecting chamber. The floating layer which forms on the surface of the central sludge collecting chamber is periodically destroyed and removed by means of water under pressure.

The appliances, machines, valves and pumps for operating the new clarification plant are centralised in the middle of the plant.

In the accompanying drawing a clarification plant according to this invention is shown by way of example.

Figure 2:
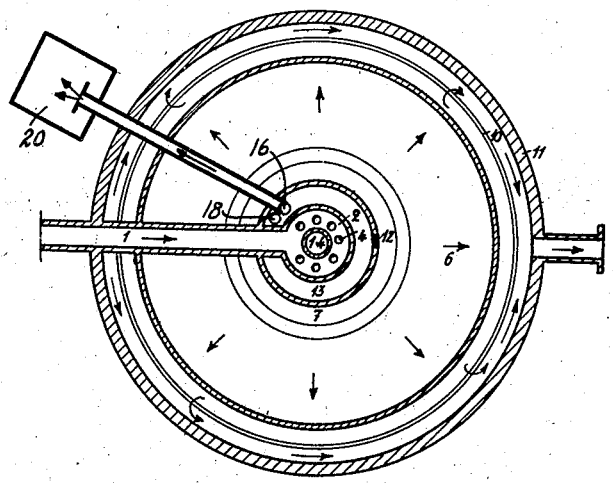

In the drawing:

Figure 1 shows a section through a clarifier which is provided with a submerged hood for catching floating material and a sludge collecting chamber for collecting the sediment material; a device is also shown for mechanically destroying by means of water under pressure the floating layer which forms at the surface of the sludge chamber; further it will be seen all the apparatus and appliances necessary for operating the plant may be supervised from a central point; and Figure 2 shows a plan of the plant.

The novel features and the mode of operation of the clarifier provided by this invention will be apparent from the following description:

The sewage containing all suspended matter passes through the supply channel 1 into a distributing channel 2. The latter is arranged ring-shaped at the surface in the middle of the clarification plant around the servicing chamber 3. From the distributing channel 2 the sewage flows with enhanced velocity through vertical supply pipes 4 having a narrow cross section into the lower part 5 of the clarification chamber 5, 6. By this means all the suspended material, that is to say all the floating substances and all the sediment, are sucked off together with the sewage into the clarification chamber. At the places where the sewage issues from the pipes 4 into the clarification chamber 5 there is a great widening of the cross section in the clarification chamber. Owing to the sudden diminution in the rate of flow brought about thereby the light floating matter forthwith rises automatically. This matter collects out of sight in the collecting chamber in a submerged hood 7 of bell shape and is thereby held back from rising to the surface of the clarification chamber 5, 6.

The heavy sediment immediately deposits on the entrance into the lower part 5 of the clarification chamber and passes through the ring shaped slit opening 8 into the sludge collecting chamber 9. The sewage freed from the floating matter and the coarsest sedimenting substances then flows slowly in an upward direction to the overflow 10 arranged in a ring-like manner. Owing to the continuously enlarging cross section of flow, the rate of flow during the ascending motion diminishes practically down to zero, with a consequence that the finest and lightest suspended matter is caused to sediment. This sediment slides downwardly on the steeply inclined side wall of the clarification chamber 5, 6 and, together with the other coarse sediment, passes through the slit opening 8 into the sludge chamber 9. The clarified sewage flowing away over the overflow 10 is collected in a collecting channel 11 and is either directly led off into receivers, for example a river, or for biological after-treatment. The floating material collected under the submerged hood 7 is periodically let off under excess water pressure into the central pump sump 13 after opening one or several valves 12. Into the pump sump 13 the sludge from the sludge collecting chamber 9 is also sent with advantage by way of a vertical sludge pipe 18 and by means of elevated water pressure. This sludge can then be pumped off, together with the floating material let off into the pump sump, into a separate sewage sludge container indicated at 20 for further purification.

At the surface of the cylinder 14 situated above the sludge collecting chamber 9 and forming the closure with respect to the clarification chamber 5, 6 a crust or sludge layer 15 forms consisting of risen suspended material, which is periodically destroyed by means of water under pressure. The water jet necessary for this destruction is sent on to the floating layer 15 either artificially by the sludge pump 16, or by natural descent from a higher sewage sludge container or digestion tank 22. By means of the water jet the substances which form the floating layer are broken up and destroyed so that they sink through the cylinder 14 back into the sludge collecting chamber 9.

The appliances used for servicing the clarification plan are centralised in the middle in a chamber 3. All valves, motors and supervision openings are here readily accessible and are combined in a conveniently supervisable form.

In the case of clarification plants for quantities of sewage which are on the large side consisting of several units according to the present invention, instead of one central servicing chamber in the middle of each unit a common servicing chamber may be arranged for all the different units.

The construction and grouping of the individual parts of the clarification plant according to this invention may for the rest be as desired, and it must be distinctly understood that the accompanying drawing shows only one constructional form of the invention by way of example.

What I claim is:

1. In a process for mechanically clarifying sewage containing liquid matter and suspended solid matter which tends to rise in said liquid matter, the steps of conducting unclarified sewage to a clarification chamber at a relatively high velocity, feeding said sewage into the lower part of said chamber so as to allow said suspended solid matter to rise, intercepting said rising matter in a part of said chamber below the surface of sewage in said chamber, withdrawing intercepted matter from the said part of said chamber and withdrawing clarified sewage from said chamber.

2. In a process for mechanically clarifying sewage containing liquid matter and suspended solid matter which tends to rise to the surface of said liquid matter, the steps of conducting unclarified sewage from a supply channel to a clarification chamber at a relatively high velocity so as to keep said suspended matter mixed with said liquid matter, feeding said sewage into the lower central part of said chamber, flowing said liquid matter from said part to a peripheral outlet, at relatively low velocity so as to cause suspended solid matter to rise in said chamber intercepting the rising matter in a part of said chamber and withdrawing intercepted sludge from the said part of said chamber concentric with and superimposed to said lower part and subjacent to the top of said chamber.

3. In a process for mechanically clarifying sewage containing liquid matter, relatively light suspended matter which tends to rise to and collect at the surface of said liquid matter, and relatively heavy suspended matter, the steps of conducting unclarified sewage thru the supply channel of a clarification plant, conducting said sewage from said supply channel to a clarification chamber, at an increased velocity so as to keep said light and heavy suspended matters mixed with said liquid matter in said supply channel, admitting said sewage into a part of said chamber intermediate the top and bottom thereof, collecting said light suspended matter in another part of said chamber, intermediate said first part and the top of said chamber, collecting said heavy suspended matter at the bottom of said chamber, collecting the floating layer formed by said collected heavy matter in a separate part of said chamber, withdrawing clarified sewage from said chamber, withdrawing said light collected matter from said other part of said chamber, and removing said heavy suspended matter from said bottom of said chamber.

4. In a sewage clarification apparatus, a supply channel, a clarification chamber, at least one tube connecting said supply channel with the lower part of said chamber and including an inlet into the latter, a submerged hood member so disposed in said chamber as to intercept solids that may tend to rise from said inlet to the level of liquid in said chamber, means to withdraw clarified sewage from said chamber and means to withdraw solids intercepted by said submerged hood member.

5. An apparatus as claimed in claim 4 in which the horizontal section of the clarification chamber widens in an upward direction.

6. An apparatus as claimed in claim 4 in which the clarification chamber has a sludge-collecting compartment at the bottom thereof and means to withdraw sludge collected in said compartment.

7. An apparatus as claimed in claim 4, wherein the end of the supply channel is disposed in the upper central part of the clarification chamber, said connecting tubes connecting said end with the lower part of said clarification chamber.

8. An apparatus as claimed in claim 4, wherein the end of the supply channel is disposed in the upper central part of the clarification chamber, said connecting tubes connecting said end with a part of said clarification chamber intermediate the top and bottom thereof, underneath the submerged hood member.

9. An apparatus as claimed in claim 4, wherein the hood member and the tubes connecting the supply channel with the lower part of the clarification chamber are disposed centrally of the clarification chamber.

10. An apparatus as claimed in claim 4 having a sludge-collecting chamber at the bottom of, and opening into, the clarification chamber, means for withdrawing sludge collected in said sludge collecting chamber, a pipe member extending upwardly from the proximity of the bottom of and communicating with, the sludge-collecting chamber, and means for breaking up the floating layer which collects at the surface of the liquid in said pipe member.

11. An apparatus as claimed in claim 4, including a pipe member extending upwardly in and communicating with the clarification chamber, and means supported by said pipe member for controlling the discharge of solids intercepted by said hood.

12. An apparatus as claimed in claim 4, having a sludge-collecting chamber at the bottom of and opening into the clarification chamber, a pipe member extending upwardly from the proximity of the opening of the sludge-collecting chamber to the top of the clarification chamber, a distributing channel connected to the end of the supply channel and disposed around the pipe member in the upper part of the clarification chamber, and a separate chamber disposed around the pipe member and substantially extending below said distributing channel; said connecting tube connecting said distributing channel to a part of said clarification chamber intermediate the top and bottom thereof, the hood member being disposed around said separate chamber and adapted to discharge into the same, means for withdrawing clarified sewage from the top of said clarification chamber, means for withdrawing light collected matter from the said part of said clarification chamber, and means for removing heavy suspended matter from said sludge-collecting chamber.

HENRY PHIL LUDWIG BENDEL.